May 12, 1970        F. MASSA        3,512,126
HERMETIC SEAL FOR UNDERWATER TRANSDUCERS
Filed March 27, 1968
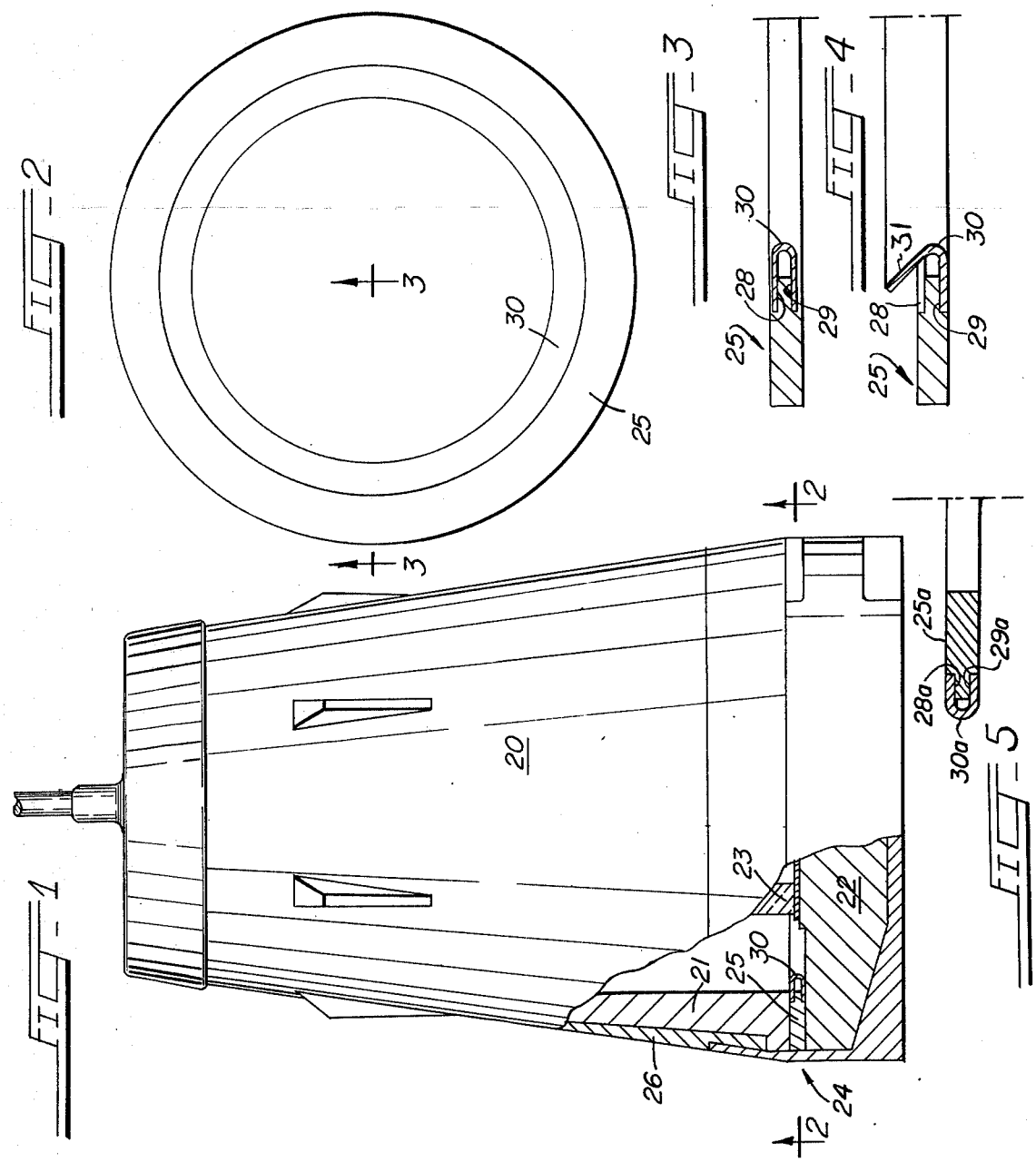
INVENTOR.
FRANK MASSA
BY Louis Bernat
ATTY

United States Patent Office 3,512,126
Patented May 12, 1970

3,512,126
HERMETIC SEAL FOR UNDERWATER TRANSDUCERS
Frank Massa, Cohasset, Mass., assignor to Dynamics Corporation of America, Hingham, Mass.
Filed Mar. 27, 1968, Ser. No. 716,513
The portion of the term of the patent subsequent to June 27, 1984, has been disclaimed
Int. Cl. H04r 1/44
U.S. Cl. 340—8          9 Claims

ABSTRACT OF THE DISCLOSURE

A rubber gasket is used to attach a vibratile plate piston diaphragm to a metallic cup which encloses a transducer. The interior edge of the gasket is covered by a metallic vapor barrier which precludes passage of moisture seeping from the water in which the transducer is used, through the gasket, and to the interior of the metallic cup. To provide a high level of compliance, the vapor barrier is made from a material which is more compliant than the gasket itself. It may be an annulus of a thin stainless steel material, such as is commonly used to make a metal bellows, for example.

---

This invention relates to means for sealing underwater equipment, and more particularly to a compliant vapor barrier for precluding a seepage of moisture through a rubber-like gasket.

The invention is especially well suited for use in transducers of the type shown in my Pat. No. 3,328,751, entitled "Electroacoustic Transducer," and assigned to the assignee of this invention. As shown in that patent, the transducer includes a metallic cup enclosing a driving element and having a vibratile plate piston diaphragm spaced therefrom by a flexible gasket. The gasket must be flexible so that the diaphragm is substantially unrestrained so that there will not be any distortion of the vibration pattern set up by the driving element. The trouble is that moisture is likely to seep through the gasket after the transducer has been in operation for a long period of time.

Accordingly, an object of the invention is to provide new and improved waterproof gasket means especially well adapted for sealing underwater transducers. In particular, an object is to provide a rubber-like gasket having a vapor barrier. Here an object is to provide such a vapor barrier without appreciably changing the compliance of the gasket.

Yet another object of the invention is to provide a method of manufacture which accomplishes the foregoing objects in the most efficient manner.

In keeping with an aspect of the invention, these and other objects are accomplished by a flat rubber-like annulus or gasket with a recessed step on the top and bottom sides. A thin metallic annulus having a somewhat U-shaped cross-section is fitted with the open arms of the U resting in the recessed steps. Thus, the metal and gasket fit together to provide smooth upper and lower surfaces. This way the gasket provides the mechanical connection and the metal provides a vapor barrier to prevent a seepage of moisture through the gasket.

The nature of an exemplary embodiment of the invention may be understood best by a reference to the attached drawings, in which:

FIG. 1 is a plan view of the above described transducer, partly broken away to show the inventive vapor barrier seal;

FIG. 2 is a plan view of the combined gasket and metallic vapor barrier seal used to close the transducer along line 2—2 of FIG. 1;

FIG. 3 is a partial cross-sectional view of the inventive gasket and barrier seal taken along line 3—3 of FIG. 2;

FIG. 4 is a similar cross-sectional view of the same gasket and barrier seal as it appears during a significant step in the inventive method of manufacture; and FIG. 5 shows an alternative embodiment taken along line 3—3 of FIG. 2 wherein the barrier seal is on the outside rim of the gasket.

In FIG. 1, the transducer 20 has the general configuration and structure disclosed in my Pat. No. 3,328,751. The part shown in a broken away cross-section includes a metallic cup 21 having an open end facing downwardly, as viewed in FIG. 1. Suspended below and substantially closing the open end of the cup 21 is a plate piston diaphragm element 22 which is driven by a transducer element 23. It should be apparent that the junction 24 between the cup 21 and plate 22 should be completely unrestrained so that the diaphragm 22 may enjoy a complete freedom to undertake non-distorted vibrational movement. This freedom is provided by a ring-shaped rubber-like gasket 25 cemented between the cup 21 and the diaphragm plate 22.

To provide a completely waterproof housing, the entire unit is molded in a waterproof rubber-like housing jacket 26.

According to the invention, the junction 24 is strengthened, reinforced, and provided with a vapor barrier which does not appreciably change the flexibility of the gasket 25. In greater detail, the inner edge of the ring-shaped gasket 25 is recessed top and bottom, at 28, 29 (FIG. 3), to provide steps for receiving the open arms of the U-shaped cross-section of the metallic annulus 30. Thus, the annulus 30 lies inside the center of the gasket ring 25, somewhat as shown in FIG. 4, when it is cemented in place. Any suitable cement may be used—such as an epoxy, for example.

One way of making the assembly might be to stretch the gasket, apply the cement, and drop the metallic annulus 30 through a hole in the stretched gasket. But this interferes with the formation of a good cemented bond because the metal 30 scrapes off some of the cement, thus leaving open spaces between the gasket 25 and the metallic annulus 30.

To avoid this scraping, the inventive method of manufacture is to leave the annulus 30 in a partially formed position with one upstanding arm 31, as shown in FIG. 4. This way, a layer of epoxy cement may be applied to the inside of the annulus 30 and to the gasket 25. The gasket 25 may then be set in place over the annulus 30 without disturbing the cement, thereby insuring a perfect bond.

After a perfectly cemented bond is assured, the annulus 30 is placed in a press, and the upper edge 31 is pressed down to make another perfect seal against the upper edge of the gasket 25. Also, the upper and lower edges of the annulus 30 lie in the recesses 28, 29 to make a smoothly bonded surface across the edges of the gasket and annulus.

The rubber and metallic gasket, constructed as shown in FIGS. 2–4, is then sealed into the transducer of FIG. 1 by cementing it between the periphery of the plate piston diaphragm 22 and the lip of the cup 21. Again, an epoxy or the equivalent may be used to complete the bond.

To insure against any reduction in compliance at the junction 24, the metallic annulus 30 is made from a material which has a compliance that is higher than the compliance of the gasket 25. This is easily done by using a thin stainless steel material of a type generally used to manufacture metallic bellows.

FIG. 5 shows an alternative embodiment of the invention. More particularly, FIG. 3 shows a ring-shaped gasket assembly with the gasket 25 of rubber-like material at the exterior or rim and the vapor barrier seal 30 in the interior of the center or the ring. If the positions of the elements 25, 30 are reversed, the rubber-like material would be in the interior or center and the vapor barrier would be at the exterior or rim. This modification is shown in FIG. 5 where the rubber-like gasket 25a is in the center and the barrier 30a is at the rim. Again, the steps 28a, 29a may be provided in the rubber-like gasket to enable flush upper and lower surfaces. Also, the manufacturing step of FIG. 4 may be adopted to enable a smooth and even distribution of the cement between gasket 25a and barrier 30a.

The advantages of the invention should now be clear. When only a rubber-like gasket 25 was used during long periods of time, the individual molecules of water seep through the gasket to the interior of the transducer. The metallic annulus 30 forms a complete vapor barrier at the edge of the gasket. Therefore, no moisture may reach the interior of the transducer regardless of any seepage which might otherwise occur.

The foregoing description illustrates a preferred embodiment of the invention. However, further embodiments and modifications will readily occur to those who are skilled in the art. Therefore, the appended claims are to be construed broadly enough to cover all equivalents reasonably falling within the scope of the invention.

I claim:

1. In combination, a transducer including a rigid housing structure with an opening at one end, a vibratile piston opposite said open end, and a flexible member interposed between the open end and the mating peripheral portion of said vibratile piston, said flexible member comprising a compliant gasket of rubber-like material having a compliant vapor barrier of resilient material sealing at least one edge thereof.

2. The invention in claim 1 wherein said vapor barrier comprises a metallic annulus having a compliance which is greater than the compliance of said rubber-like material.

3. The invention set forth in claim 1 wherein said gasket is annular, said vapor barrier comprising a metallic annulus having a generally U-shaped cross-section embracing an edge of said gasket to completely shield it against providing an unobstructed moisture path between the inside of the transducer and the external environment.

4. The invention in claim 1 wherein said gasket is a circhular flat ring and said vapor barrier is a thin annulus embracing at least either the internal or external circular edge of said flat ring.

5. The invention in claim 1 wherein said gasket is a flat circular ring having an internal and external diameter, the thickness of said gasket being reduced in the region of the inner diameter of said ring to form top and bottom recessed steps, a metallic annulus having a U-shaped peripheral cross-section embracing the inner periphery of said gasket, the region of reduced thickness being located within the parallel faces of the U-shaped annulus.

6. The invention in claim 5 further characterized in this that the thickness of the metal annulus is approximately equal to the depth of the recess so that the upper and lower surfaces of the combined gasket and metallic annulus is a smooth surface.

7. A method of manufacturing a hermetic seal comprising the steps of:
   (1) forming a compliant material into a ring-shaped gasket having inner and outer diameters,
   (2) forming an annulus of material which is at least as compliant as said gasket material and which is impervious to the passage of moisture, said annulus having a partially completed U-shaped cross-section, with one arm of the U being left in an upstanding position,
   (3) placing the gasket concentrically over said upstanding arm with cement applied between the gasket and the annulus, and
   (4) applying a compressional force upon said upstanding arm to close said U and bring the parallel arms of the U into contact with said gasket.

8. An underwater transducer comprising a metallic cup enclosing a driving transducer element and having a piston plate diaphragm suspended therefrom, a hermetic seal interposed between said cup and plate, said seal comprising a flexible gasket having a thin metallic vapor barrier of highly elastic material attached thereto, and a waterproof jacket enclosing said assembly of cup, seal, and plate.

9. The transducer of claim 8 wherein said seal is a rubber-like ring having a stainless steel annulus concentric therewith.

References Cited

UNITED STATES PATENTS

| | | | |
|---|---|---|---|
| 857,134 | 6/1907 | Wilcox | 277—235 X |
| 1,191,651 | 7/1916 | Bauroth | 277—231 |
| 1,937,793 | 12/1933 | Seaberg | 277—231 X |
| 3,174,764 | 3/1965 | Hobson | 277—231 |
| 3,215,442 | 11/1965 | Papenguth | 277—231 |
| 3,311,873 | 3/1967 | Schloss | 340—10 |
| 3,328,751 | 6/1967 | Massa | 340—10 |
| 3,093,581 | 6/1963 | Pall et al. | 277—234 X |
| 3,302,953 | 2/1967 | Glasgow | 277—231 X |

RODNEY D. BENNETT, Jr., Primary Examiner

B. L. RIBANDO, Assistant Examiner